US010781917B2

(12) United States Patent
Dougherty et al.

(10) Patent No.: US 10,781,917 B2
(45) Date of Patent: Sep. 22, 2020

(54) POWER TOOL DIRECTION SELECTOR

(71) Applicant: Ingersoll-Rand Company, Davidson, NC (US)

(72) Inventors: Thomas S. Dougherty, Mooresville, NC (US); Jason Christopher Bartoszek, Bethlehem, PA (US)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 140 days.

(21) Appl. No.: 16/176,187

(22) Filed: Oct. 31, 2018

(65) Prior Publication Data
US 2020/0132189 A1 Apr. 30, 2020

(51) Int. Cl.
*B25F 5/00* (2006.01)
*F16H 61/24* (2006.01)
*F16H 59/04* (2006.01)
*B25B 21/00* (2006.01)

(52) U.S. Cl.
CPC ............ *F16H 61/24* (2013.01); *B25F 5/001* (2013.01); *F16H 59/04* (2013.01); *B25B 21/00* (2013.01); *F16H 2059/047* (2013.01); *F16H 2061/243* (2013.01)

(58) Field of Classification Search
CPC ......... F16H 2061/242; F16H 2059/047; F16H 2059/048; B25F 5/001
USPC ............................ 173/217, 213, 170, 104, 18
See application file for complete search history.

(56) References Cited

U.S. PATENT DOCUMENTS

| | | | |
|---|---|---|---|
| 5,083,619 A * | 1/1992 | Giardino | B25B 21/02 173/104 |
| 5,581,165 A | 12/1996 | Laio | |
| 5,620,073 A | 4/1997 | Marks | |
| 5,687,802 A * | 11/1997 | Spooner | B25F 5/02 173/169 |
| 6,443,239 B1 * | 9/2002 | Izumisawa | B25B 21/02 173/168 |
| 7,594,549 B2 | 9/2009 | Hua | |
| 8,919,456 B2 * | 12/2014 | Ng | B25B 23/147 173/11 |
| 9,481,080 B2 * | 11/2016 | Kuehne | B25F 5/001 |
| 9,878,435 B2 * | 1/2018 | Ito | B25B 21/00 |
| 2006/0060365 A1 * | 3/2006 | Kunz | B25D 17/00 173/48 |
| 2006/0102367 A1 | 5/2006 | Etter et al. | |
| 2008/0251269 A1 | 10/2008 | Hua | |
| 2011/0011610 A1 * | 1/2011 | Welke | B25B 21/00 173/217 |

(Continued)

*Primary Examiner* — Gloria R Weeks
(74) *Attorney, Agent, or Firm* — Taft Stettinius & Hollister LLP

(57) ABSTRACT

A power tool includes a button useful to select a direction of rotation of the power tool. The button can be used to select between forward, reverse, and neutral. The power tool includes a housing which is coupled with an abutment structure which engages with the button. A sawtooth engagement is formed between the abutment structure and the button. The sawtooth engagement can be asymmetric in shape to provide different force vectors depending on whether the button is pushed in a first or a second direction. The sum of the resistive forces can be the same whether the button is pushed in the first or second direction, owing to the asymmetric forces caused by the sawtooth engagement which make up for differences in other internal resistive forces.

20 Claims, 15 Drawing Sheets

(56) References Cited

U.S. PATENT DOCUMENTS

| | | | |
|---|---|---|---|
| 2012/0273242 A1* | 11/2012 | Eshleman | B25B 23/0064 173/1 |
| 2012/0325511 A1 | 12/2012 | Cheng | |
| 2013/0186665 A1* | 7/2013 | Hua | B25F 5/02 173/170 |
| 2013/0213680 A1* | 8/2013 | Chen | B25F 5/001 173/47 |
| 2014/0102742 A1* | 4/2014 | Eshleman | B25B 23/147 173/183 |
| 2019/0360582 A1* | 11/2019 | Habara | F16H 61/24 |
| 2020/0132189 A1* | 4/2020 | Dougherty | F16H 61/24 |

* cited by examiner

POWER TOOL DIRECTION SELECTOR

TECHNICAL FIELD

The present invention generally relates to power tools having button selectors capable of setting the direction of rotation of the power tool, and more particularly, but not exclusively, to power tools having pushbuttons which are used to select the direction of rotation of the tool.

BACKGROUND

Providing direction selectors with similar feels to a user remains an area of interest. Some existing systems have various shortcomings relative to certain applications. Accordingly, there remains a need for further contributions in this area of technology.

SUMMARY

One embodiment of the present invention is a unique power tool push button engagement structure. Other embodiments include apparatuses, systems, devices, hardware, methods, and combinations for promoting similarity of feel when depressing a button in the forward and the reverse directions. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
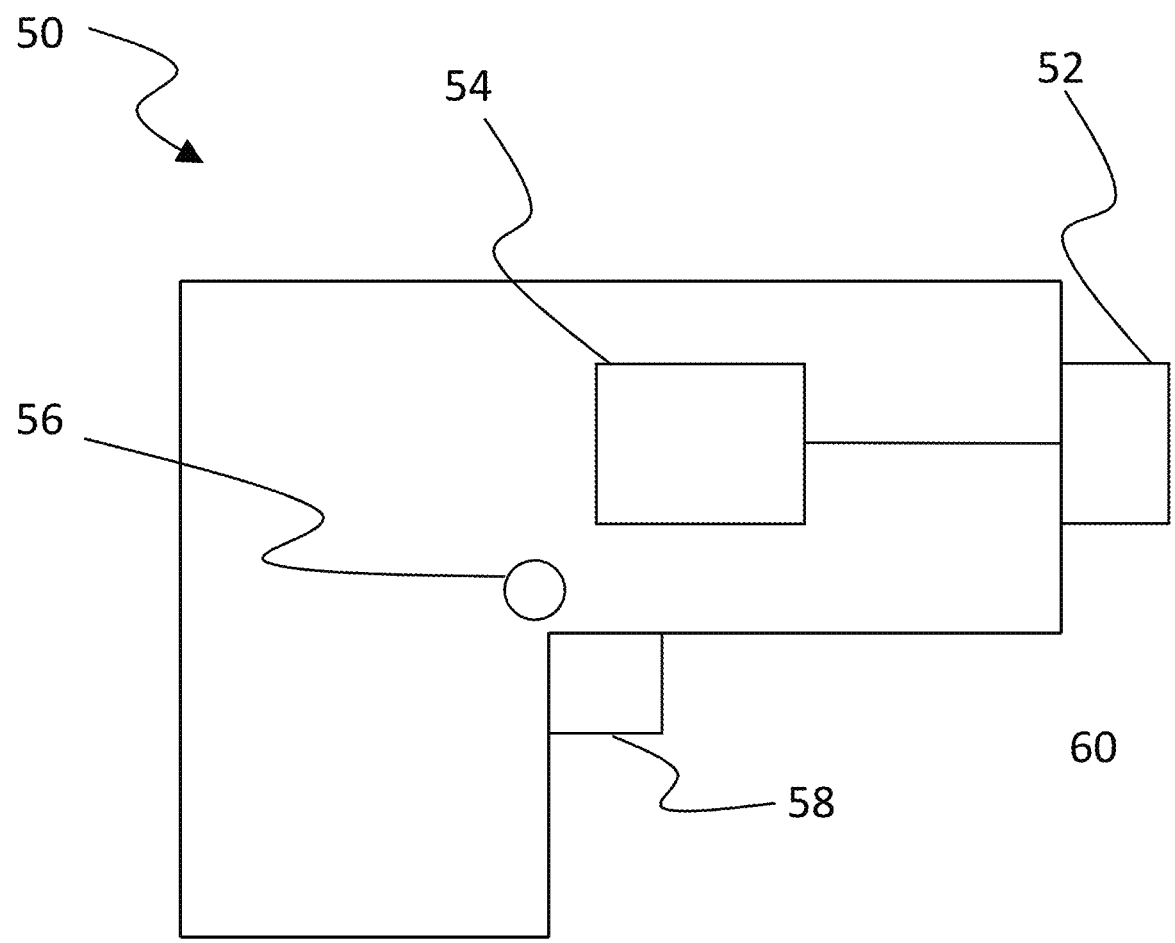
FIG. 1 illustrates an embodiment of a power tool.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, one embodiment of a hand held tool 50, such as a powered assembly tool, is illustrated which can be used to provide driving power to any number of power tool driven members 52 such as sockets, socket drivers, drill bits, etc. The hand held tool 50 can include or be coupled with a motor 54 to drive the power tool driven members 52. The motor 54 can take many different forms, including an electric motor, but other embodiments can use other types of motors including pneumatic motors, etc.

The hand held tool 50 of the illustrated embodiment is able to selectively drive the power tool driven members 52 in either a forward or a reverse direction through selective use of a slideable button 56. In some embodiments the slideable button 56 can also be used to place the hand held tool 50 in a neutral condition. Accordingly, the button 56 is used to control the power flow relationship from the motor 54 to the power tool driven member 52, whether that power flow relationship is wholly contained within the motor 54 or includes additional mechanisms such as a gear train or other power transmission device.

To operate the power tool 50, the button 56 is placed into one of at least three positions (e.g. forward, neutral, or reverse) and a trigger 58 is engaged by a user to activate the motor 54 which delivers power to the tool driven member 52 in any of the configurations selected by the button 56. The trigger 58 can be operably connected to the motor 54 using any variety of mechanisms, including an electrical and/or mechanical switch. Likewise, the button 56 can be operably connected to control the power flow relationship provided to the tool driven member 52 using any variety of mechanisms, including an electrical and/or mechanical switch. In many forms the button 56 can be activated by a thumb, finger, or other face applicator. As will be described further below, some embodiments of the button 56 can activated from either side of the tool 50.

Figure 2:
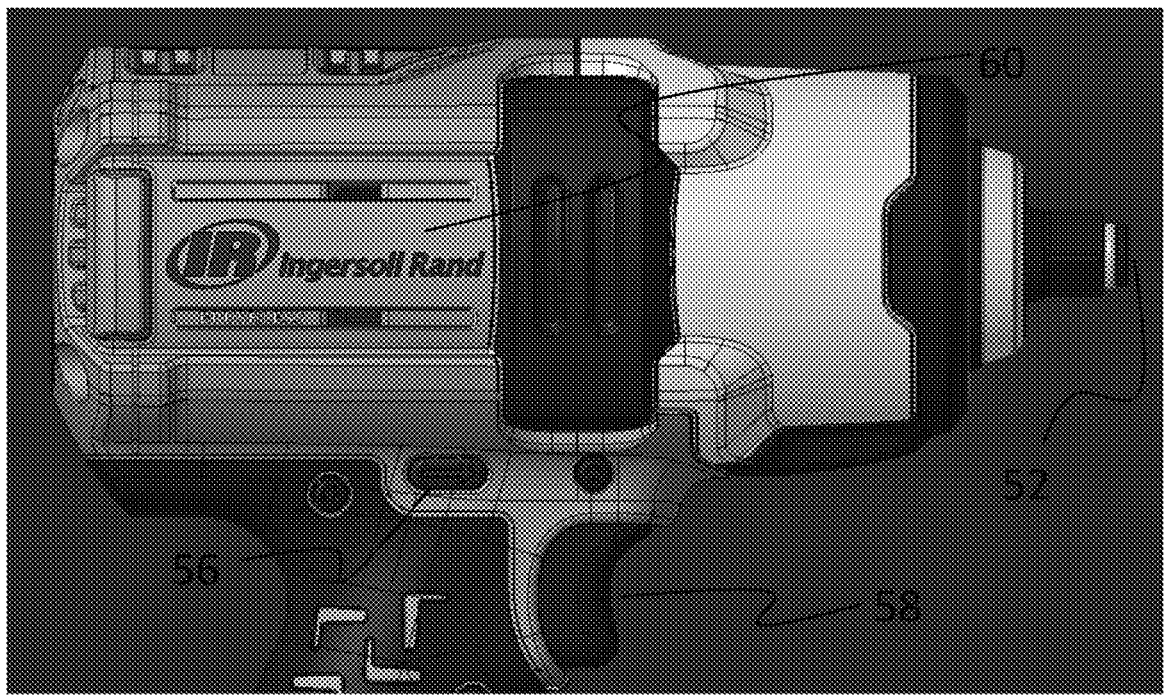
FIG. 2 illustrates an embodiment of a power tool.
Figure 3:
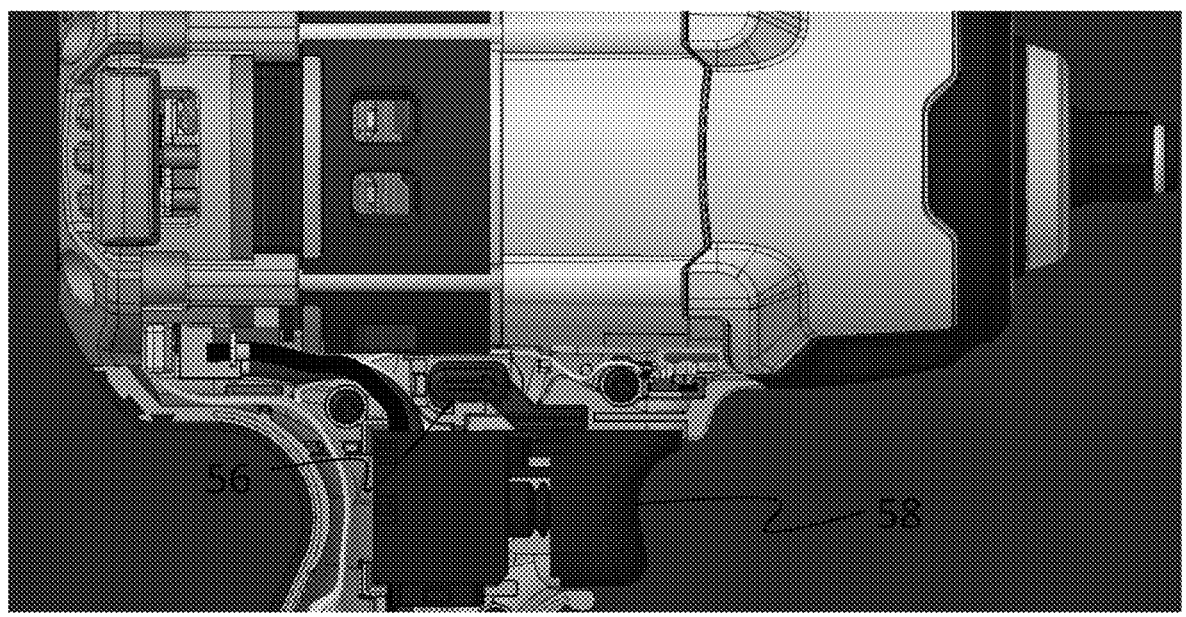
FIG. 3 illustrates an embodiment of a power tool having a portion of the housing removed.
Figure 4:
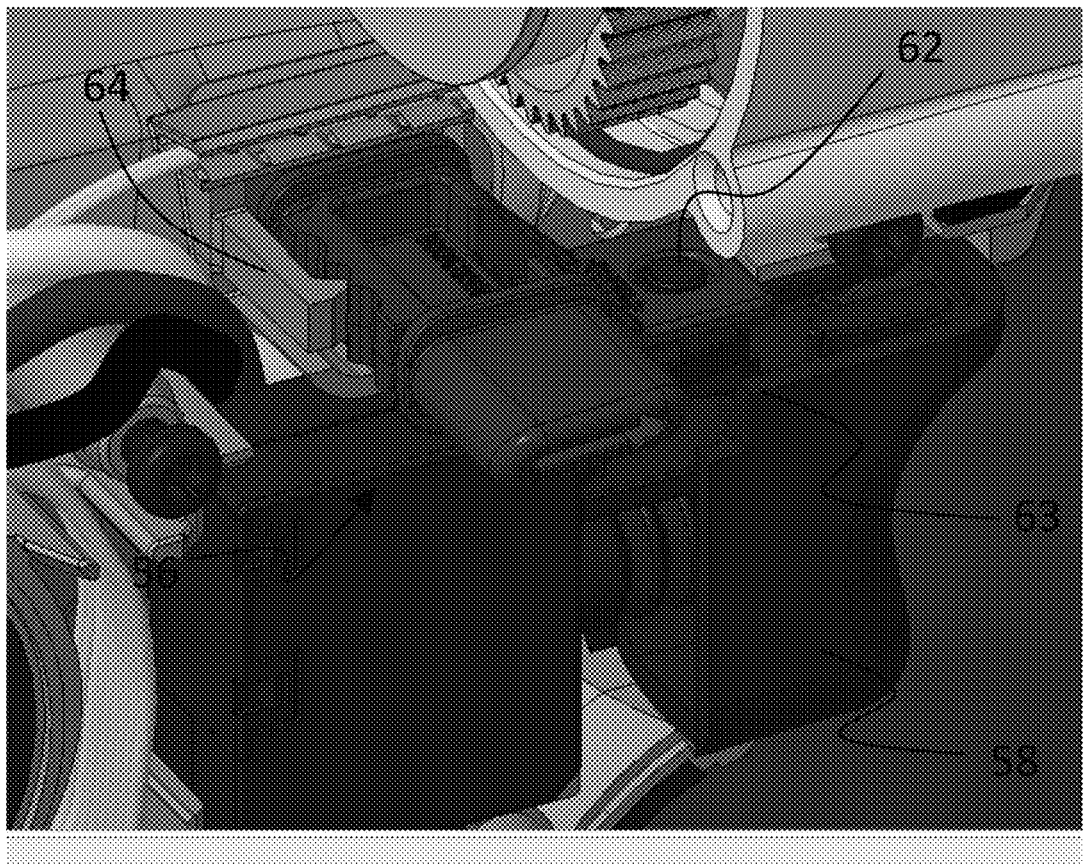
FIG. 4 illustrates an embodiment of a power tool having a portion of the housing removed.
Figure 5:
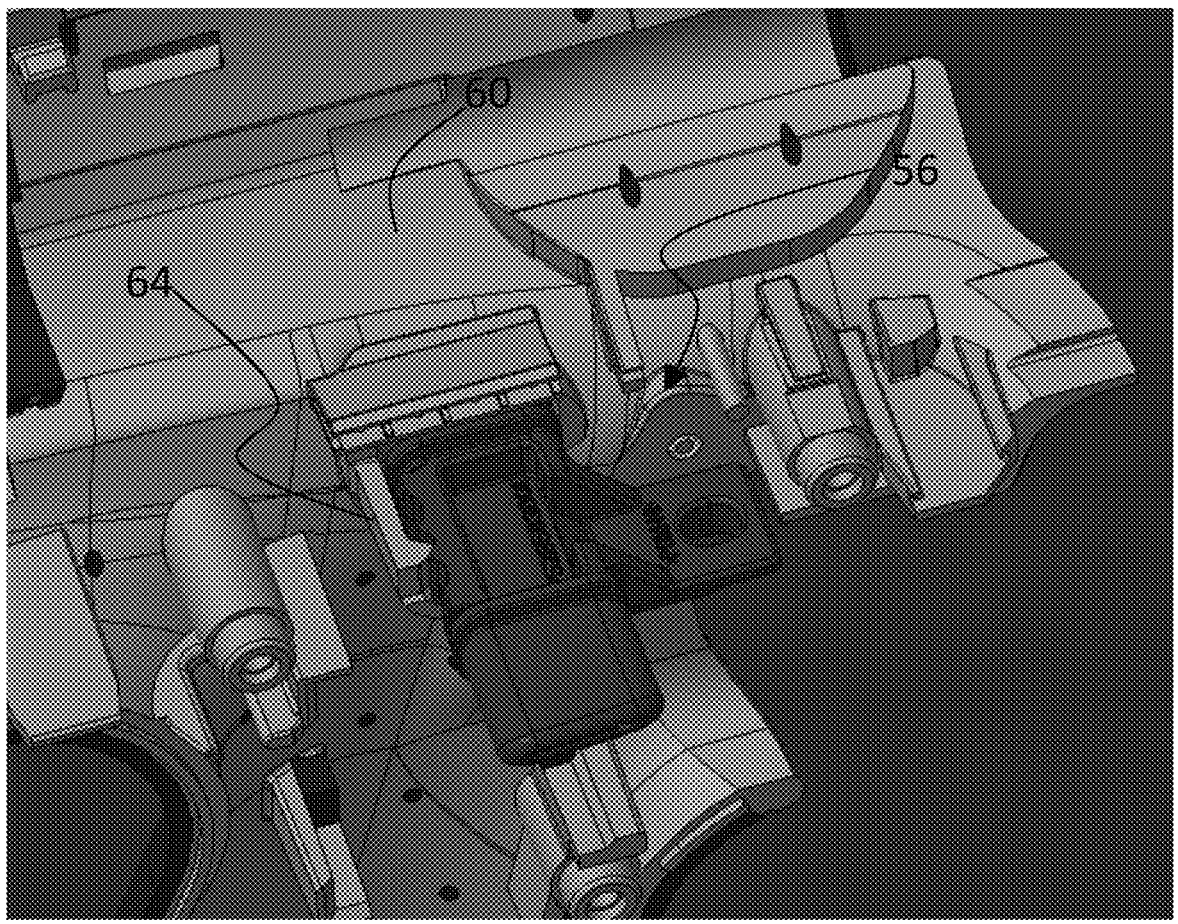
FIG. 5 illustrates an embodiment of a power tool having a button used to select the direction of motion of the tool.

Turning now to FIGS. 2-5, one embodiment of the power tool 50 is illustrated in which an embodiment of the button 56 can be seen. FIG. 2 illustrates the power tool 50 in which its housing 60 is used to enclose internal components. FIG. 3 illustrates a cutaway view of the power tool 50 in which further details of the button 50 can be seen. FIG. 4 illustrates a closer view of the button 56 in which the trigger 58 can be seen in close proximity. FIG. 4 also depicts the button 56 in engagement with a switch 62 which is used to communicate with the motor 54. In the illustrated embodiment the motor 54 is an electric motor. The switch 62 is constructed in the illustrated embodiment as having a protrusion that engages an opening in the button 56. When the button 56 is moved between positions the switch 62 can pivot about a point, the pivoting action of which is useful to send a signal to the motor 54. The switch 62 can be integrated into a trigger assembly, part of which includes the trigger 58 and part of which includes the components necessary to detect a change of position of the switch 62 and send a signal to the motor 54. The switch 62 can include a portion that rests between raised edges 63 of the trigger 58. FIG. 5 illustrates an embodiment of the button or actuator 56 nested inside of part of the housing 60. Since the housing 60 has been removed in the view of FIG. 5 for illustration purposes, it will be understood that the button can also be nested inside an opposing part of the housing 60.

Figure 6:
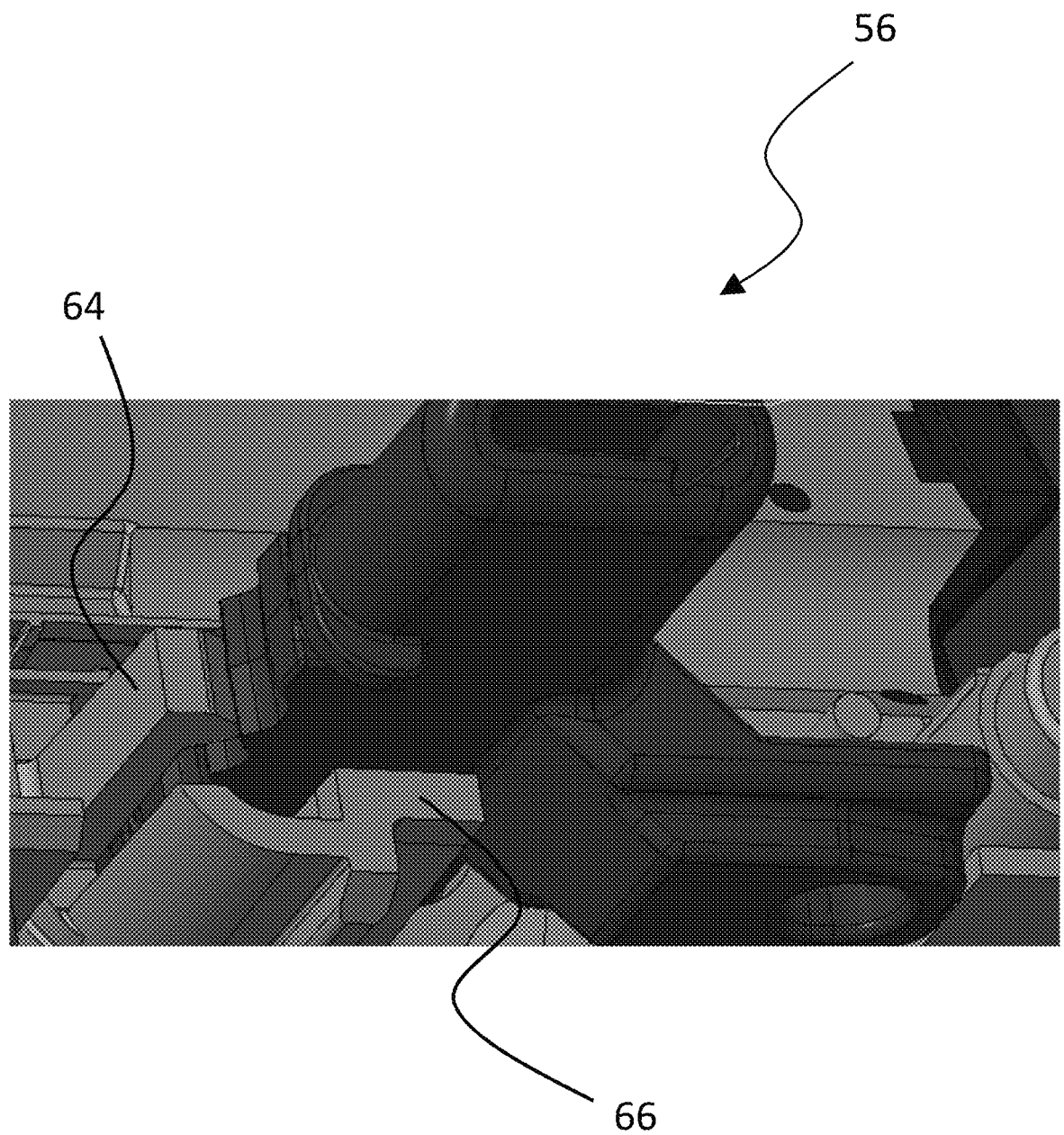
FIG. 6 illustrates an embodiment of a power tool having a button used to select the direction of motion of the tool.

FIGS. 5-6 depict a simpler view in which certain components have been removed for ease of reference. FIGS. 5-6 depict engagement of the button 50 with an abutment structure 64 (also depicted above in FIG. 4) coupled with the housing 60. Such abutment structure 64 can be molded into the housing 60 to form a unitary construction, but in other embodiments the abutment structure 64 can be separately made and later affixed to the housing 60. The button 50 can be supported by a shelf 66 on which the button 50 is capable of sliding. The shelf 66 can extend into an interior of the housing 60, but in other forms an opening in the housing 60 from which the button 56 can protrude can be used in lieu of a shelf 66 that extends into the interior. In one form the shelf 66 can extend across the entirety of the interior of the housing. In other forms a single shelf 66 can extend from one side of the housing 60, while in other forms separate shelfs 66 can extend from each side of the housing 60, but do not otherwise join together to form a single shelf 66.

Figure 7:
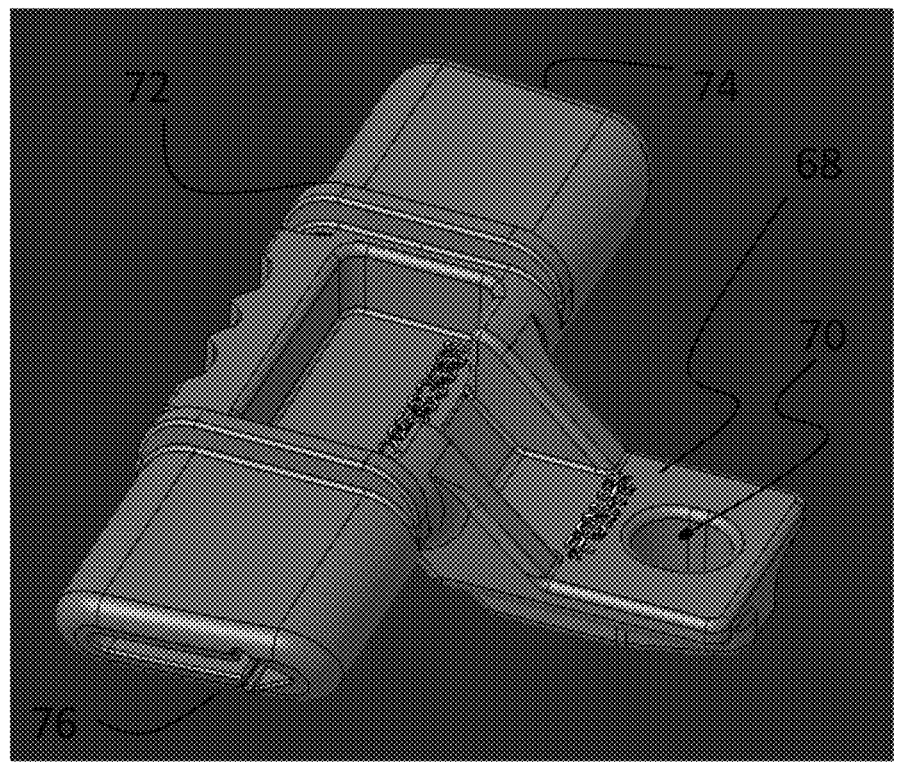
FIG. 7 illustrates an embodiment of a button.
Figure 8:
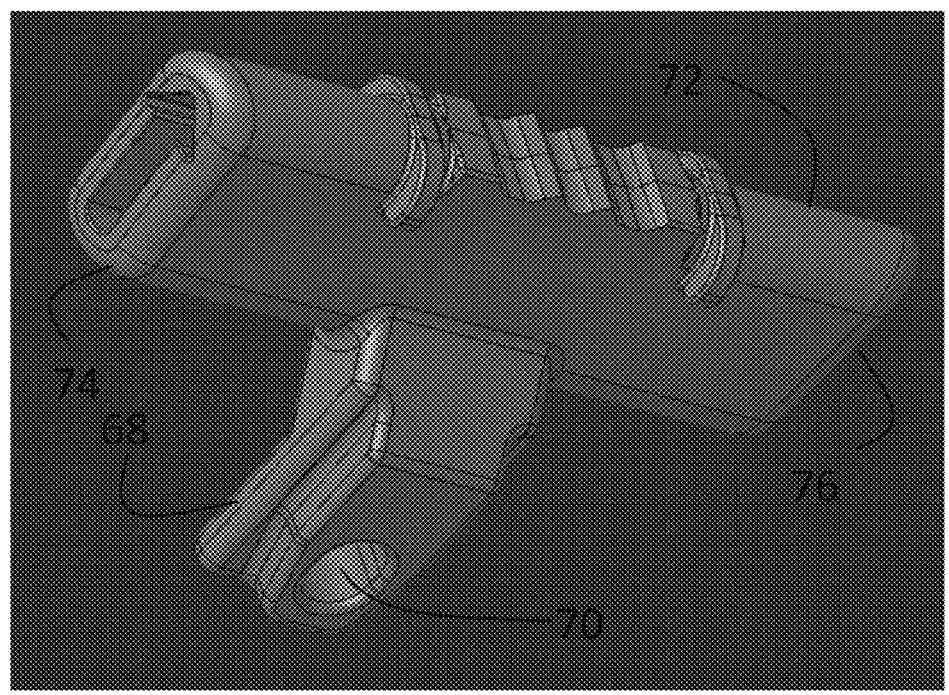
FIG. 8 illustrates an embodiment of a button.

FIGS. 7-8 depict a view of one embodiment of the button 56. The button 56 can include an extension or projection 68 which includes an opening 70 useful to engage the switch 62. The opening can be a recess formed into the button 56 but which does not extend through the button, or in other embodiments can include a passage through the thickness of the button 56. The projection 68 is illustrated as being set off from a main body 72 of the button 56. The main body 72 of the button 56 can itself extend along an axis from a first end 74 of the button to a second end 76 of the button. Each of the first end 74 and second end 76 can include a feature indicating a direction of rotation of the tool driven member 52 (e.g. the arrows depicted), but not all embodiments need include such features. The features can be molded into, printed upon, or otherwise coupled with the ends 74 and/or 76. The projection 68 is shown as extending in a transverse direction from the axis along which the main body is arranged in the illustrated embodiment. The projection 68 is also offset from a bottom side of the main body 72. In some forms the button 56 may not include the projection 68, in which case the opening 70 can be formed directly in the main body 72. In other forms, the projection 68 can be co-planar with the main body 72 such that it is no longer offset from a bottom of the button as shown in the illustrated embodiment of FIG. 7. Also depicted in FIGS. 7 and 8 are various sawtooth shaped ridges and valleys 77 that are used to engage with the abutment structure 64, further details of which are provided below.

Figure 9:
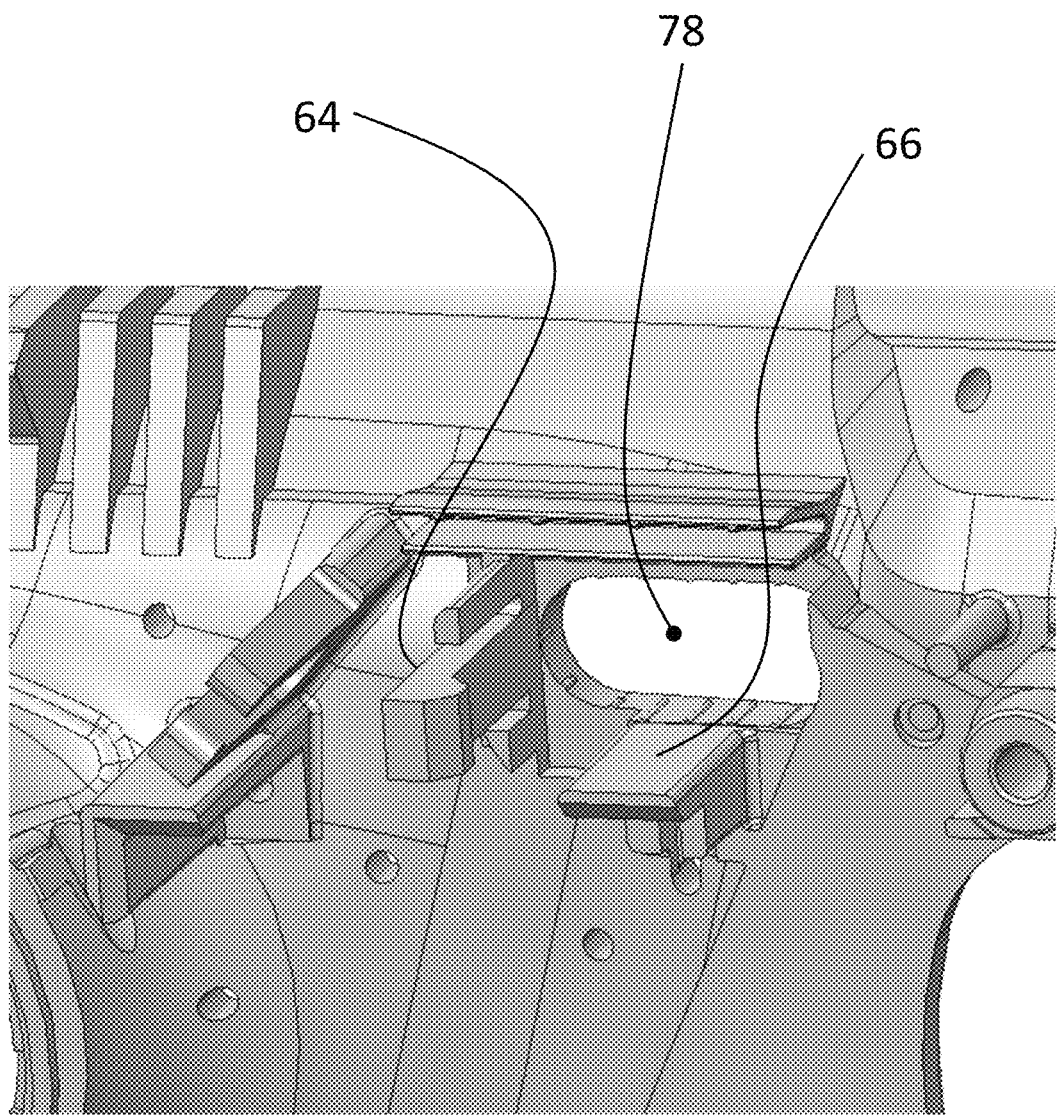
FIG. 9 illustrates an embodiment of a housing and abutment structure.

FIG. 9 depicts one embodiment of the housing 60 having the abutment structure 64 and shelf 66. An opening 78 formed in the housing 60 is also depicted.

Figure 10:
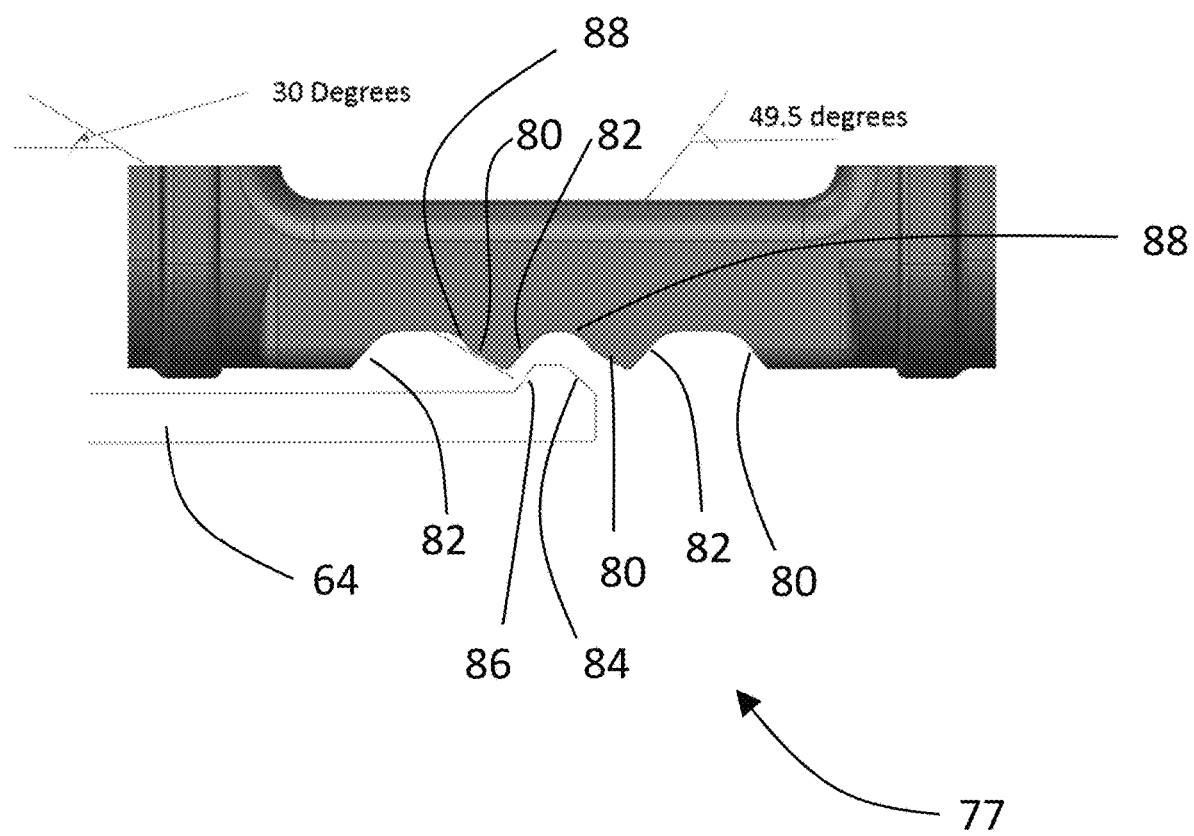
FIG. 10 illustrates an engagement between a button and abutment structure.

FIG. 10 depicts the sawtooth shaped ridges and valleys that are used to engage with the abutment structure 64. The sawtooth shaped ridges and valleys 77 include respective front facing side 80 and rear facing side 82 which sit opposing each other. The left most rear facing side 82 and the right most front facing side 80 in the illustrated embodiment need not take on the same shape as the sides 80/82 located in the middle of the figure, and in fact can take on any arbitrary shape. In some forms the left most rear facing side 82 and the right most front facing side 80 can be in the form of a large cutout to provide clearance. As will be appreciated by the description herein, the shapes of the sides 80/82 in the middle of the figure take on more prominent role in setting the forces requires to move the button between any of the forward, neutral, and reverse positions. It will be appreciated that the button may include only forward and reverse positions, in which case the number of faces and ridges/valleys will be different than that depicted in the illustrated embodiment. The abutment structure 64 likewise can include a front facing side 84 and a rear facing side 86, where it will be understood that the front facing sides of the abutment structure 64 and button 56 interact with each other, along with the rear facing sides of each of the abutment 64 and button 56 interact with each other.

The apex of each of the sawtooth shaped ridges and valleys formed by opposing front facing sides 80/84 and rear facing sides 82/86 can have any variety of shapes. For example, the apex of the ridges formed between 80 and 82 on the button 56 can be formed as a distinct point, but other configurations of the apex can have a flat or rounded peak, among other potential shapes. The same is true of the sides forming the ridge of the abutment structure 64. The relative size of the flat or rounded top can vary depending on the application.

The engagement of the abutment structure 64 and the button 56 is therefore along at least a portion of the sawtooth shape 77. Though the illustrated embodiment depicts complementary formation of a sawtooth engagement between the abutment 64 and button 56, some embodiments can be have a sawtooth engagement primarily formed by one or the other of the abutment 64 and button 56. To set forth nonlimiting examples: the sawtooth engagement can be dominated by the configuration of the button 56 with a point contact used by the abutment 64; or the sawtooth engagement can be dominated by the configuration of the abutment 64 with a point contact used by the button 56. Point contacts used in either of the button 56 or abutment structure 64 can take on a variety of shapes, including a rounded head, a two pronged head, etc. Of interest in the sawtooth engagement is the angle at which the engagement produces a contact force vector as will be described further below.

The configuration and orientation of the abutment structure 64 results in a different elastic response depending on whether the button 56 is pushed in the forward or the reverse direction. In part, the different elastic response is a function of the location of the cantilevered arm at which of the contact force vector is applied as well as the particular direction of the contact force vector. When the button 56 is pushed to contact the respective front side faces of the abutment 64 and button 56, the cantilevered location of the resultant contact force vector is different than when the button 56 is pushed in the opposite direction to contact the respective rear side faces of the abutment 64 and button 56. In the illustrated embodiment, the rear side faces 82/86 produce a location of the contact force vector which is closer to a lever end of the cantilevered abutment 64 than the front side faces 80/84. In addition to a difference in location of force application, a force imparted to the abutment structure 64 when the front side faces 80 and 84 are contacted results in a force vector having a component that places the cantilevered member 64 in compression while a force imparted to the structure 64 when the rear side faces 82 and 86 are contacted results in a force vector having a component that places the structure 64 in tension. Furthermore, since the contact force vectors are contemplated to be above a centerline along the length of the abutment structure 64, such offset also creates a bending force, each of the compression and tension forces producing a different direction of bend as will be understood by those of skill in the art.

The angle at which the contact force vector is applied when the front side faces 80 and 84 are contacted is contemplated to be different than the angle at which the contact force vector is applied when the rear side faces 82 and 86 are contacted. The illustrated embodiment depicts formation of a contact force angle of 30 degrees when the front side faces 80 and 82 are urged into contact, along with a contact force angle of 49.5 degrees when the rear side faces 82 and 86 are contacted. Each of the front 80/84 and rear 82/86 facing sides can be arranged at identical orientations along each of the ridges, but not all embodiments need include identity of orientation across every single face (whether front face or rear face). For example, the front facing side 84 can be matched to be identical to the rear facing side 86 of the abutment structure 64, while the engagement angle is provided through asymmetric angles of the front 80 and rear 82 facing sides of the button 56.

The difference in angles between the front and rear engagements aids in accommodating a similarity of force needed to urge the button in both a forward and a rearward direction. Since the location of the contact force vector is different and the elastic response of the abutment structure 64 is different depending on the direction in which the button is pushed, the different angles of the sawtooth engagement permit a balancing of forces in both the forward and rearward direction. Greater force is applied to the sawtooth engagement along the axis of the button push when the angle is greater, as is shown by the contact force angle between the rearward facing sides 82 and 86. The shallower angle between the front facing sides 80 and 84 results in a lower component of force applied to the sawtooth engagement. The different angles thus offset differences in the aggregate contribution of each of the separate internal forces which resists a push of the button. In some embodiments of the instant application, resistance force from the switch 62 can be the same whether moved in a forward or a rearward direction, but not all embodiments of the switch may be configured as such. Tailoring of the angle at which the force vector is applied to either of the front or rear facing sides can also therefore account for variations in switch responsiveness.

The embodiment depicted in FIG. 10 includes a cutout 88 formed near the root of each of the front facing side 80 of the button 56. Such a cutout can be located near the root of any of the front facing sides 80, and alternatively and/or additional be located near the root of any of the rearward facing sides 82.

Figure 11:
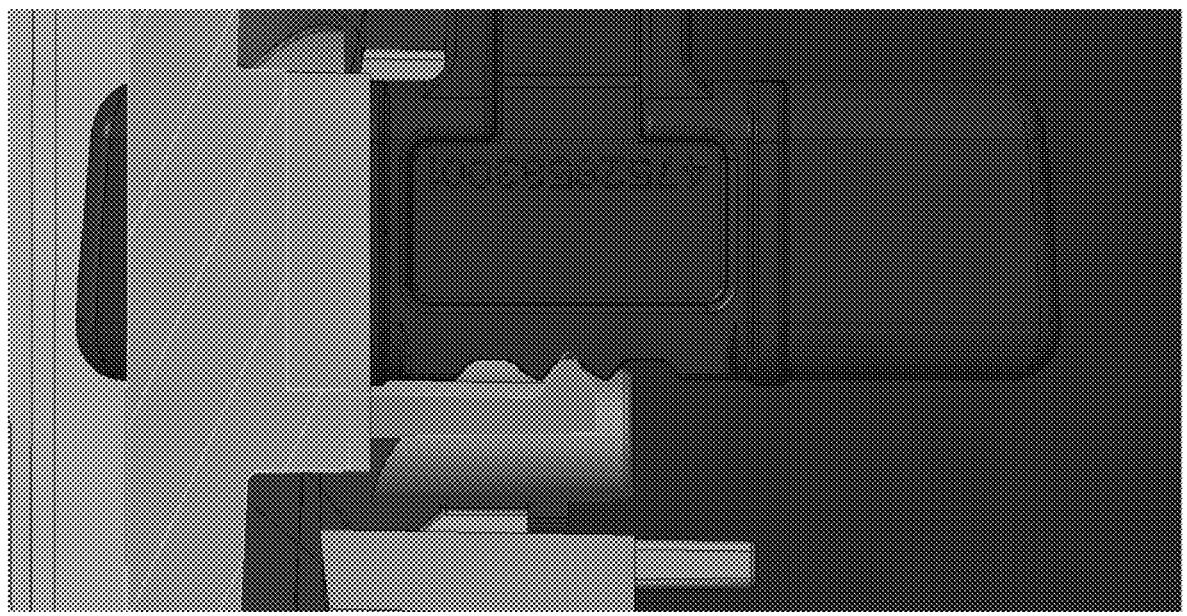
FIG. 11 illustrates an engagement between a button and abutment structure.

FIG. 11 depicts an embodiment of the abutment structure engaged in a neutral position of the button 56. Also shown in FIG. 11 is an end of the button extending past an edge of the housing on the left side of the figure when the button 56 is in the neutral position.

Figure 12:
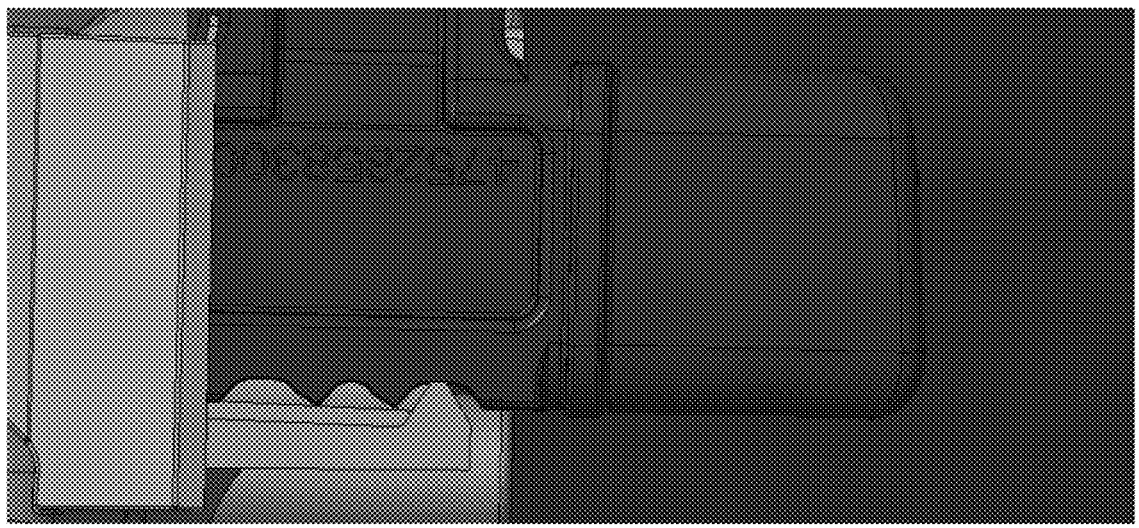
FIG. 12 illustrates an engagement between a button and abutment structure.
Figure 13:
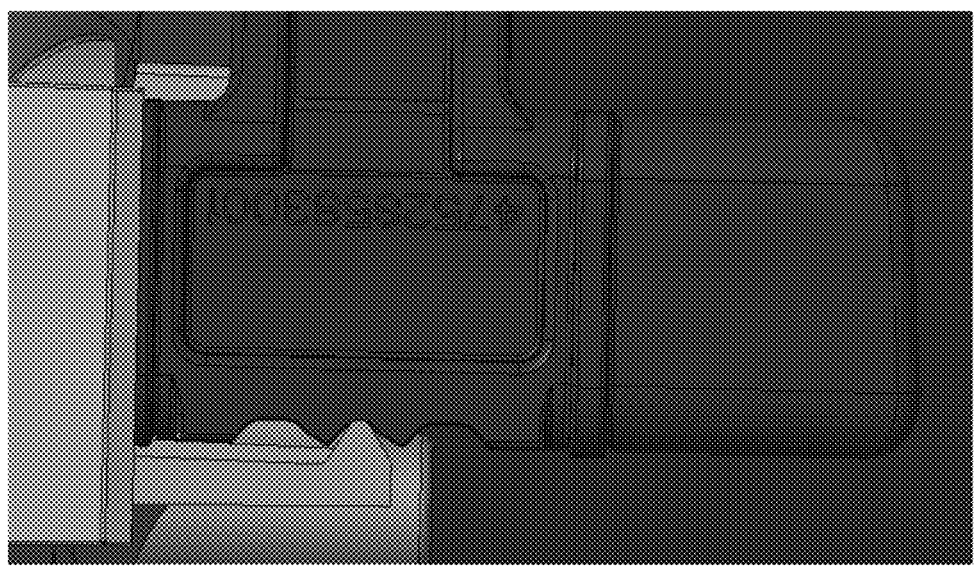
FIG. 13 illustrates an engagement between a button and abutment structure.
Figure 14:
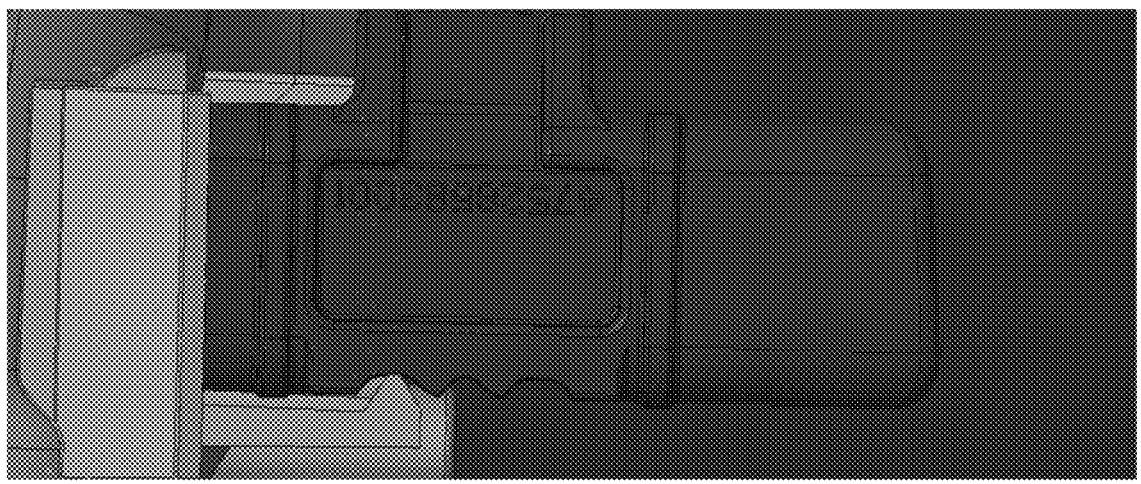
FIG. 14 illustrates an engagement between a button and abutment structure.

FIGS. 12-14 illustrate various operating positions of the button 56. FIG. 12 depicts the button 56 in a position which results in a configuration of the power tool 50 such that activation of the trigger 58 drives the tool driven member 52 in a forward direction. FIG. 13 depicts the button 56 in a position which results in a neutral configuration of the power tool 50. FIG. 14 depicts the button 56 in a position which results in a configuration of the power tool 50 such that activation of the trigger 58 drives the tool driven member 52 in a rearward direction.

Figure 15:
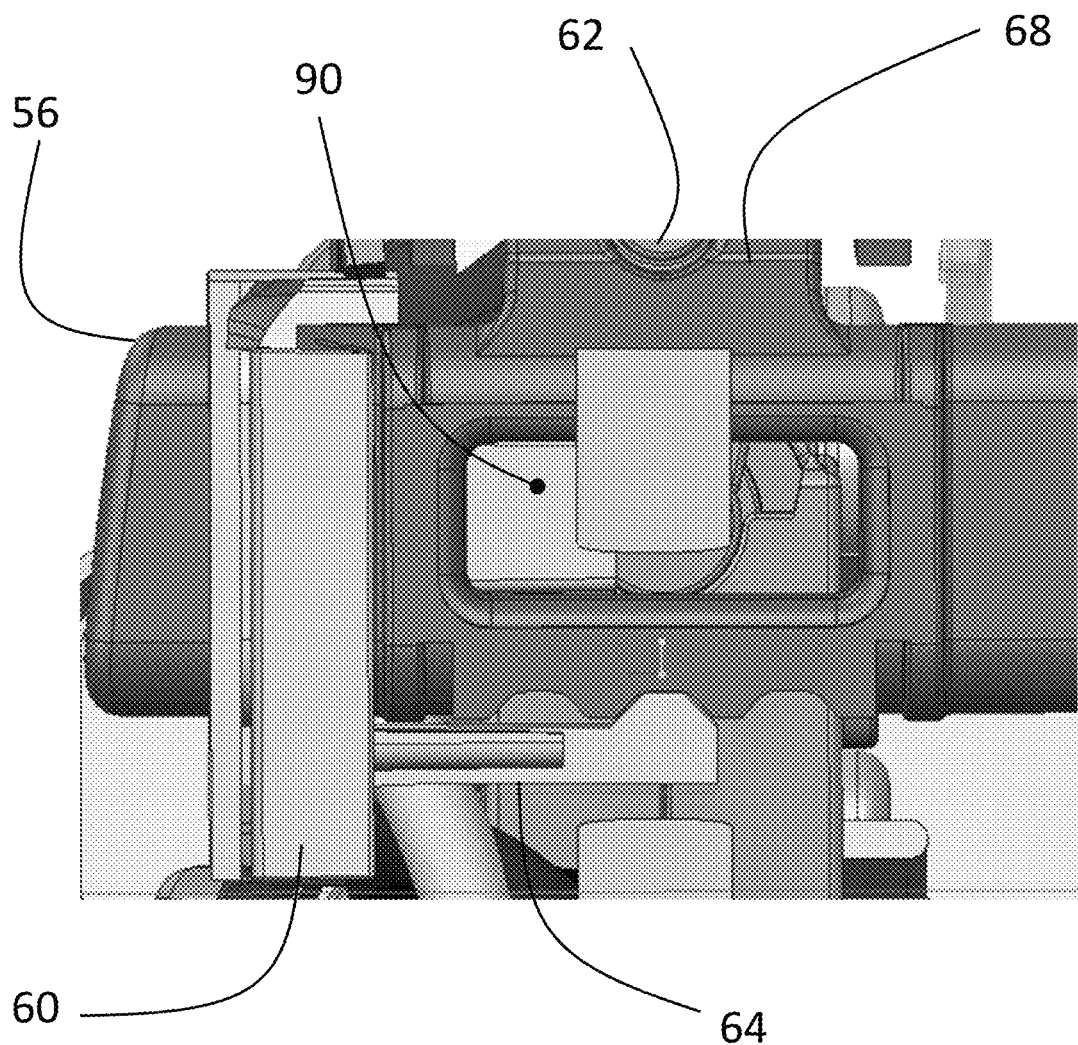
FIG. 15 illustrates an engagement between a button and abutment structure.

FIG. 15 depicts an embodiment in which the button 56 includes a central passage 90 formed in its main body 72. Such a passage 90 can be used to encourage air flow within the housing 60. Any of the aforementioned embodiments may also have one or more similar passages 90 to encourage air flow. FIG. 15 also depicts an embodiment in which the front faces 80/84 are matched in angle and rear faces 82/86 are matched in angle. Not all embodiments need include identify of angles between the faces 80/84 and 82/86 as is described above. The engagement between the surfaces, and resultant contact force angle, is all that is needed to provide for asymmetry of applied internal force to the sawtooth engagement to account for differing total internal forces, the sum total of which provide for similar feel when the button 56 is pushed.

Any embodiments of either or both of the abutment structure 64 and button 56 can be made from a variety of materials. In one form either or both structure 64 and button 56 can be made of plastic. Nonlimiting embodiments of plastic include nylon, glass filled, nylon, etc.

In any of the embodiments disclosed herein, the depth of the valleys adjacent to any particular ridge of the button 56 can be sided to permit the tip of the abutment structure 64 to nest within without contacting the bottom of the valley. In other forms the tip of the structure 64 may contact one or more of the valley adjacent to any given ridge.

One aspect of the present application provides an apparatus comprising a power tool structured to engage a workpiece and operable to provide a bi-directional driving torque to the workpiece, the power tool including: a housing having an interior into which extends an abutment structure, a driving motor disposed within the interior of the housing and useful to generate the force to provide the driving torque, a switch disposed within the housing having a forward and reverse position, the switch configured to control the bi-directional driving torque delivered from the driving motor, and a selector button interconnected with the switch and structured to engage the abutment structure, wherein the selector button and abutment structure engage each other along a sawtooth shape having a plurality of front facing sides and rearward facing sides, the plurality of front facing sides structured to produce a different contact force vector than the plurality of rearward facing sides when the selector button is moved in a forward or a rearward direction, respectively, each of the contact force vectors including a sliding force component and a normal force component, wherein a magnitude of the normal force component varies as a function of whether the selector button is moved in a first direction or a second direction as a result of the different front facing side and rearward facing sides.

A feature of the present application includes wherein the plurality of front facing sides oriented at a front facing angle and the plurality of rearward facing sides oriented at a rearward facing angle, the front facing angle different than the rearward facing angle.

Another feature of the present application includes wherein the abutment structure is a cantilevered arm, and wherein the contact force vector sufficient to cause relative movement along the sawtooth shape is also sufficient to cause a bending of the cantilevered arm.

Yet another feature of the present application includes wherein abutment structure includes a projection at an end of the cantilevered arm, the abutment structure having a configuration that defines the sawtooth shape, and wherein a first pressing force applied to a first end of the selector button required to move the selector button in the forward direction is the same as a second pressing force applied to a second end of the selector button required to move the selector button in the rearward direction.

Still another feature of the present application includes wherein the sawtooth shape is defined at least by one of the abutment structure and the selector button.

Yet still another feature of the present application includes wherein the sawtooth shape is contacted by a contact point that follows the sawtooth shape when the selector button is moved but that the contact point does not include a complementary shape to the sawtooth shape.

Still yet another feature of the present application includes wherein the switch includes an arm, and wherein the selector button includes a main body and a platform that extends away from the main body, the main body including a coupling opening useful to receive the arm of the switch.

A further feature of the present application includes wherein the front facing sides includes an angle of 30 degrees relative to an axis along which the selector button is actuated, and wherein the rearward facing sides include an angle of 49.5 degrees relative to the axis along which the selector button is actuated, and wherein the switch includes a neutral position.

Another aspect of the present application includes an apparatus comprising: a hand-held power tool structured having an housing and structured to provide driving torque to an operative end useful to impart work to a workpiece, the housing including an abutment structure useful to determine a direction of the driving torque, a driving motor disposed internal to the housing of the hand-held power tool and useful to generate the torque to be provided to the operative end, the operative end structured to provide bi-directional torque, a switch disposed within the housing having a forward and reverse position, the switch configured to control a direction of torque delivered from the driving motor to the operative end, and a selector button interconnected with the switch and structured to engage the abutment structure, the selector button configured to translate along a button depressing axis, wherein the selector button and abutment structure form a plurality of ridges each defined between opposing walls where the plurality of ridges are separated by a plurality of valleys, the plurality of valleys representing the forward and reverse position of the switch, each of the plurality of ridges having asymmetrical shape such that a first of the opposing walls is at a different absolute angle to the button depressing axis than a second of the opposing walls.

A feature of the present application includes where a total force required to push the button in a first direction along the button depressing axis is the same as a total force required to push the button in a second direction opposite the first direction along the button depressing axis.

Another feature of the present application includes wherein the abutment structure includes a cantilevered arm, and wherein the total force includes a force required to push the button in the first direction includes a force to place the cantilevered arm in an elastic bending mode.

Still another feature of the present application includes wherein the total force in the first direction includes a force to move the switch from the forward toward the reverse position as well as a force required for relative movement between the selector button and the abutment structure along one of the opposing walls, and wherein the total force in the second direction includes a force to move the switch from the reverse toward the forward position as well as a force required for relative movement between the selector button and the abutment structure along another of the opposing walls.

Yet another feature of the present application includes wherein the asymmetrical shape is formed in the selector button, the abutment structure, or both.

Still yet another feature of the present application includes wherein the abutment structure is a cantilevered arm having a ridge formed at a lever distance from an anchor point of the cantilevered arm.

Yet still another feature of the present application includes wherein the abutment structure and portion of the selector button are formed of plastic, and wherein the plurality of valleys further represent a neutral position of the switch.

A further feature of the present application includes wherein a total force required to move the selector button along the button depressing axis in either a first direction or an opposing second direction includes a force component from the switch and a force component owing to the asymmetrical shape, the asymmetrical shape forming a different contact force direction as a function of whether the selector button is pushed along the button depressing axis in either the first or second directions.

Still another aspect of the present application provides a method comprising: depressing a selector button on a power tool in a first direction with a first force, the control selection button useful to place the power tool in a forward operating position and a reverse operating position, as a result of the depressing the selector button on in the first direction, engaging a front facing side of a sawtooth shape defined between an actuation surface of the control selection button to generate a first force, the engaging the front facing side performed at a first acute angle relative to an axial motion of the selector button, depressing the selector button on the power tool in a second direction opposite the first direction with a second force, and as a result of the depressing the selector button on in the second direction, engaging a rearward facing side of the sawtooth shape to generate a second force, the engaging the rearward facing side performed at a second acute angle relative to an axial motion of the selector button, the second acute angle smaller than the first acute angle.

A feature of the present application further includes bending a cantilevered arm as a result of the depressing the selector button in the second direction.

Another feature of the present application further includes resisting movement of the selector button via resistance force from a switch disposed in an interior of the power tool.

Still another feature of the present application includes wherein the first force is the same as the second force.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An apparatus comprising:
a power tool structured to engage a workpiece and operable to provide a bi-directional driving torque to the workpiece, the power tool including:
a housing having an interior into which extends an abutment structure;
a driving motor disposed within the interior of the housing and useful to generate the force to provide the driving torque;
a switch disposed within the housing having a forward and reverse position, the switch configured to control the bi-directional driving torque delivered from the driving motor; and
a selector button interconnected with the switch and structured to engage the abutment structure, wherein the selector button and abutment structure engage each other along a sawtooth shape having a plurality of front facing sides and rearward facing sides, the plurality of front facing sides structured to produce a different contact force vector than the plurality of rearward facing sides when the selector button is moved in a forward or a rearward direction, respectively, each of the contact force vectors including a sliding force component and a normal force component, wherein a magnitude of the normal force component varies as a function of whether the selector button is moved in a first direction or a second direction as a result of the different front facing side and rearward facing sides.

2. The apparatus of claim 1, wherein the plurality of front facing sides oriented at a front facing angle and the plurality of rearward facing sides oriented at a rearward facing angle, the front facing angle different than the rearward facing angle.

3. The apparatus of claim 1, wherein the abutment structure is a cantilevered arm, and wherein the contact force vector sufficient to cause relative movement along the sawtooth shape is also sufficient to cause a bending of the cantilevered arm.

4. The apparatus of claim 3, wherein abutment structure includes a projection at an end of the cantilevered arm, the abutment structure having a configuration that defines the sawtooth shape, and wherein a first pressing force applied to a first end of the selector button required to move the selector button in the forward direction is the same as a second pressing force applied to a second end of the selector button required to move the selector button in the rearward direction.

5. The apparatus of claim 3, wherein the sawtooth shape is defined at least by one of the abutment structure and the selector button.

6. The apparatus of claim 5, wherein the sawtooth shape is contacted by a contact point that follows the sawtooth shape when the selector button is moved but that the contact point does not include a complementary shape to the sawtooth shape.

7. The apparatus of claim 3, wherein the switch includes an arm, and wherein the selector button includes a main body and a platform that extends away from the main body, the main body including a coupling opening useful to receive the arm of the switch.

8. The apparatus of claim 3, wherein the front facing sides includes an angle of 30 degrees relative to an axis along which the selector button is actuated, and wherein the rearward facing sides include an angle of 49.5 degrees relative to the axis along which the selector button is actuated, and wherein the switch includes a neutral position.

9. An apparatus comprising:
a hand-held power tool structured having an housing and structured to provide driving torque to an operative end useful to impart work to a workpiece, the housing including an abutment structure useful to determine a direction of the driving torque;
a driving motor disposed internal to the housing of the hand-held power tool and useful to generate the torque to be provided to the operative end, the operative end structured to provide bi-directional torque;
a switch disposed within the housing having a forward and reverse position, the switch configured to control a direction of torque delivered from the driving motor to the operative end; and
a selector button interconnected with the switch and structured to engage the abutment structure, the selector button configured to translate along a button depressing axis, wherein the selector button and abutment structure form a plurality of ridges each defined between opposing walls where the plurality of ridges are separated by a plurality of valleys, the plurality of valleys representing the forward and reverse position of the switch, each of the plurality of ridges having asymmetrical shape such that a first of the opposing walls is at a different absolute angle to the button depressing axis than a second of the opposing walls.

10. The apparatus of claim 9, where a total force required to push the button in a first direction along the button depressing axis is the same as a total force required to push the button in a second direction opposite the first direction along the button depressing axis.

11. The apparatus of claim 9, wherein the abutment structure includes a cantilevered arm, and wherein the total force includes a force required to push the button in the first direction includes a force to place the cantilevered arm in an elastic bending mode.

12. The apparatus of claim 11, wherein the total force in the first direction includes a force to move the switch from the forward toward the reverse position as well as a force required for relative movement between the selector button and the abutment structure along one of the opposing walls, and wherein the total force in the second direction includes a force to move the switch from the reverse toward the forward position as well as a force required for relative movement between the selector button and the abutment structure along another of the opposing walls.

13. The apparatus of claim 9, wherein the asymmetrical shape is formed in the selector button, the abutment structure, or both.

14. The apparatus of claim 13, wherein the abutment structure is a cantilevered arm having a ridge formed at a lever distance from an anchor point of the cantilevered arm.

15. The apparatus of claim 14, wherein the abutment structure and portion of the selector button are formed of plastic, and wherein the plurality of valleys further represent a neutral position of the switch.

16. The apparatus of claim 15, wherein a total force required to move the selector button along the button depressing axis in either a first direction or an opposing second direction includes a force component from the switch and a force component owing to the asymmetrical shape, the asymmetrical shape forming a different contact force direction as a function of whether the selector button is pushed along the button depressing axis in either the first or second directions.

17. A method comprising:
- depressing a selector button on a power tool in a first direction with a first force, the control selection button useful to place the power tool in a forward operating position and a reverse operating position;
- as a result of the depressing the selector button on in the first direction, engaging a front facing side of a sawtooth shape defined between an actuation surface of the control selection button to generate a first force, the engaging the front facing side performed at a first acute angle relative to an axial motion of the selector button;
- depressing the selector button on the power tool in a second direction opposite the first direction with a second force; and
- as a result of the depressing the selector button on in the second direction, engaging a rearward facing side of the sawtooth shape to generate a second force, the engaging the rearward facing side performed at a second acute angle relative to an axial motion of the selector button, the second acute angle smaller than the first acute angle.

18. The method of claim 17, which further includes bending a cantilevered arm as a result of the depressing the selector button in the second direction.

19. The method of claim 18, which further includes resisting movement of the selector button via resistance force from a switch disposed in an interior of the power tool.

20. The method of claim 19, wherein the first force is the same as the second force, and wherein the control selection button is further useful to place the power tool in a neutral operating position.

* * * * *